US006036234A

United States Patent [19]

Chess

[11] Patent Number: 6,036,234

[45] Date of Patent: Mar. 14, 2000

[54] CONSTRUCTION OF A BUSINESS FORM WITH PATTERNED SILICONE LINER

[75] Inventor: Stanley Chess, Golfstown, N.H.

[73] Assignee: Moore U.S.A., Inc., Grand Island, N.Y.

[21] Appl. No.: 09/087,494

[22] Filed: May 29, 1998

Related U.S. Application Data

[60] Provisional application No. 60/060,435, Sep. 30, 1997.

[51] Int. Cl.[7] .............................. B32B 3/00; B32B 7/06; B41L 1/32

[52] U.S. Cl. .............................. 283/101; 283/79; 283/80; 283/81; 283/105; 462/29; 462/30; 462/31; 462/26; 462/37; 462/38

[58] Field of Search .............................. 283/79, 80, 81, 283/101, 105; 462/29, 30, 31, 26, 37, 38; 156/289

[56] References Cited

U.S. PATENT DOCUMENTS

| | | | |
|---|---|---|---|
| Re. 33,616 | 6/1991 | Welsch . | |
| 3,153,868 | 10/1964 | Jones . | |
| 4,171,831 | 10/1979 | Robinson . | |
| 4,379,573 | 4/1983 | Lomeli et al. . | |
| 5,006,191 | 4/1991 | Schmidt . | |
| 5,129,682 | 7/1992 | Ashby . | |
| 5,209,698 | 5/1993 | Dolan . | |
| 5,254,381 | 10/1993 | Hoffmann et al. . | |
| 5,324,153 | 6/1994 | Chess . | |
| 5,328,208 | 7/1994 | Garrison . | |
| 5,348,780 | 9/1994 | Boggs et al. . | |
| 5,362,106 | 11/1994 | Longtin . | |
| 5,421,942 | 6/1995 | Hoffmann . | |
| 5,482,328 | 1/1996 | Stewart . | |
| 5,507,901 | 4/1996 | Limina et al. . | |
| 5,562,789 | 10/1996 | Hoffmann . | |
| 5,632,842 | 5/1997 | Oliver et al. . | |
| 5,707,713 | 1/1998 | Langan et al. | 283/81 |
| 5,904,973 | 5/1999 | Coward et al. | 283/81 |

*Primary Examiner*—Willmon Fridie, Jr.
*Assistant Examiner*—Mark T. Henderson
*Attorney, Agent, or Firm*—Nixon & Vanderhye P.C.

[57] ABSTRACT

A business form (preferably continuous) with self-contained labels has significant versatility and a number of advantages. A cellulose ply is applied larger than a release liner ply, while the release liner ply may be provided so that one edge (e.g. with tractor drive holes) extends past a substantially parallel edge of the cellulose ply. At the opposite edge of the release liner ply adhesive release material is provided along between about 10–50% of the length of the edge so that the release material covered portion of the edge is not substantially permanently adhered to the edge by the adhesive between the plies. This allows the labels formed in the cellulose ply where overlapped by the release liner to be removed from the back or front, and allows one to separate the release liner ply completely from the cellulose ply for ease of recycling. The method of making the forms typically uses a conventional Webtron press.

20 Claims, 3 Drawing Sheets

CONSTRUCTION OF A BUSINESS FORM WITH PATTERNED SILICONE LINER

CROSS REFERENCE TO RELATED APPLICATION

This application is based upon Provisional Application Ser. No. 60/060,435 filed Sep. 30, 1997.

BACKGROUND AND SUMMARY OF THE INVENTION

There are many situations in which it is desirable to have business forms with self contained labels, particularly continuous business forms.

The labels are provided on one part of the business form, while the rest of the form is used for imprinting or imaging other indicia. A typical such business form and method of production thereof are shown in U.S. Pat. No. 5,254,381, the disclosure of which is hereby incorporated by reference herein. While the business form therein is advantageous for many situations, it does not have as high a degree of versatility as desired, and removing the labels from the forms can be difficult in some circumstances. Part of the problem with ease of removal of the labels is due to the fact that the release liner is substantially permanently adhered to the paper (cellulose) ply along the entire length of one edge thereof.

According to the invention, a business form with labels, and a method of construction of the form, are provided that have more versatility than the form as disclosed in the '381 patent, yet have all of the advantages thereof, and in fact even more advantages. The form according to the invention includes a cellulose ply larger than a second, release liner, ply, and the release liner ply may be provided so that one edge (e. g. with tractor drive holes therein) extends past a substantially parallel edge of the cellulose ply, and at the opposite edge of the release liner ply adhesive release material is provided along between about 10–50% of the length of the edge so that the release material covered portion of the edge is not substantially permanently adhered to the edge by the adhesive between the plies. This allows the labels die cut (or otherwise formed) in the cellulose ply where overlapped by the release liner to be removed from the back or the front, and also allows one to separate the release liner ply completely from the cellulose ply, if desired (after use) for ease of recycling since one can get a portion started which allows breaking of the "permanent" bond between the cellulose and the release liner where no release material is provided on the release liner.

According to one aspect of the present invention a business form is provided comprising the following components: A first substantially rectangular cellulose ply having first and second faces, and first and second substantially parallel side edges having a first length, and spaced a first distance from each other. A second substantially rectangular ply having first and second faces, and first and second substantially parallel side edges having a second length, and spaced a second distance. The second face of the second ply having adhesive release material over substantially the entire area thereof, except that no active release material is provided along a strip adjacent at least one of the first and second edges the strip having a length of about 50–90% of the second length. The second face of the second ply overlying the first face of the first ply with the first and second side edges of each substantially parallel to each other. And pressure sensitive adhesive between the first ply first face and the second ply second face to readily releasably hold the plies together where the adhesive engages the release material, and to substantially permanently hold the plies together where the second ply overlaps the first ply and there is no active adhesive release material on the second ply second face.

The first ply preferably has at least one label formed therein by die cuts or lines of weakness (such as perforations or score lines) where the first ply overlies the second ply, and an end portion of the second ply at the second edge includes active adhesive release material. A strip having no active release material is preferably provided only along the second edge of the second ply, and the first edge of the second ply preferably extends past the first edge of the first ply so that the plies do not overlap at an exposed strip at the first edge of the second ply. The exposed strip typically has tractor drive holes formed therein, and the second distance is between about 25–40% of the first distance (e.g. about 30–35%).

The second ply first and second edges are preferably between the first ply first and second edges, and the second ply may have strips having no active release material along both the first and second edges of the second ply. The second distance may be, for example, at least 20% less than the first distance. The strip with no active release material is typically formed by strip coating the second ply so that no release material at all is provided at the strip.

The form according to the invention may have a third ply like the second ply only disposed in association with the first ply second face, with adhesive between the third ply second and the first ply second face. The first edge of the second ply typically extends past the first edge of the first ply so that the plies do not overlap at the exposed strip at the first edge of the second ply. The second ply may be completely within the area encompassed by the first ply.

According to another aspect of the present invention a method of making a business form is provided comprising the following steps: (a) Forming a first cellulose material ply in web form, the first ply having first and second faces, and first and second substantially parallel side edges. (b) Forming a second ply in web form, the second ply having first and second faces and first and second substantially parallel side edges. (c) Skip coating adhesive release material on said second ply second face so that it substantially covers said second ply second face except along an edge strip adjacent at least one of said first and second side edges, to provide at least one edge strip with no adhesive release material, which strip has a length which is less than the entire length of a said side edge. (d) Applying pressure sensitive adhesive to at least the majority of the second face of the second ply, including at said edge strip. (e) Bringing the second face of the second ply into juxtaposition with the first face of the first ply so that the plies at least partially overlap and the edge strip of the second ply is between both the first and second edges of the first ply, and so that the adhesive readily releasably holds the first and second plies together except at the edge strip, where the adhesive substantially permanently holds the first and second plies together. And (f) forming at least one label in the first ply where the first ply overlaps the second ply and is adhesively held thereto.

Step (d) may be practiced so as not to apply adhesive along the first edge of the second ply, and step (b) may be practiced so as to provide the first edge of the second ply extending outwardly from the first edge of the first ply. Step (b) may be practiced so as to form tractor drive holes along the second ply first edge, and step (e) may be further practiced so that the tractor drive holes extend outwardly from the first edge of the first ply. Step (c) may be practiced to produce an edge strip having a length of about 50–90% the length of the second edge of the second ply, and step (c) may be practiced to provide an edge strip with no adhesive release material along both the first and second edges of the second ply.

According to another aspect of the present invention a business form is provided produced by the method steps (a) through (f) as described above.

It is a primary object of the present invention to provide a particularly advantageous business form with self-contained labels, and an advantageous method of manufacture thereof. This and other objects of the invention will become clear from an inspection of the detailed description of the invention and from the appended claims.

DETAILED DESCRIPTION OF THE DRAWINGS

Figure 1:
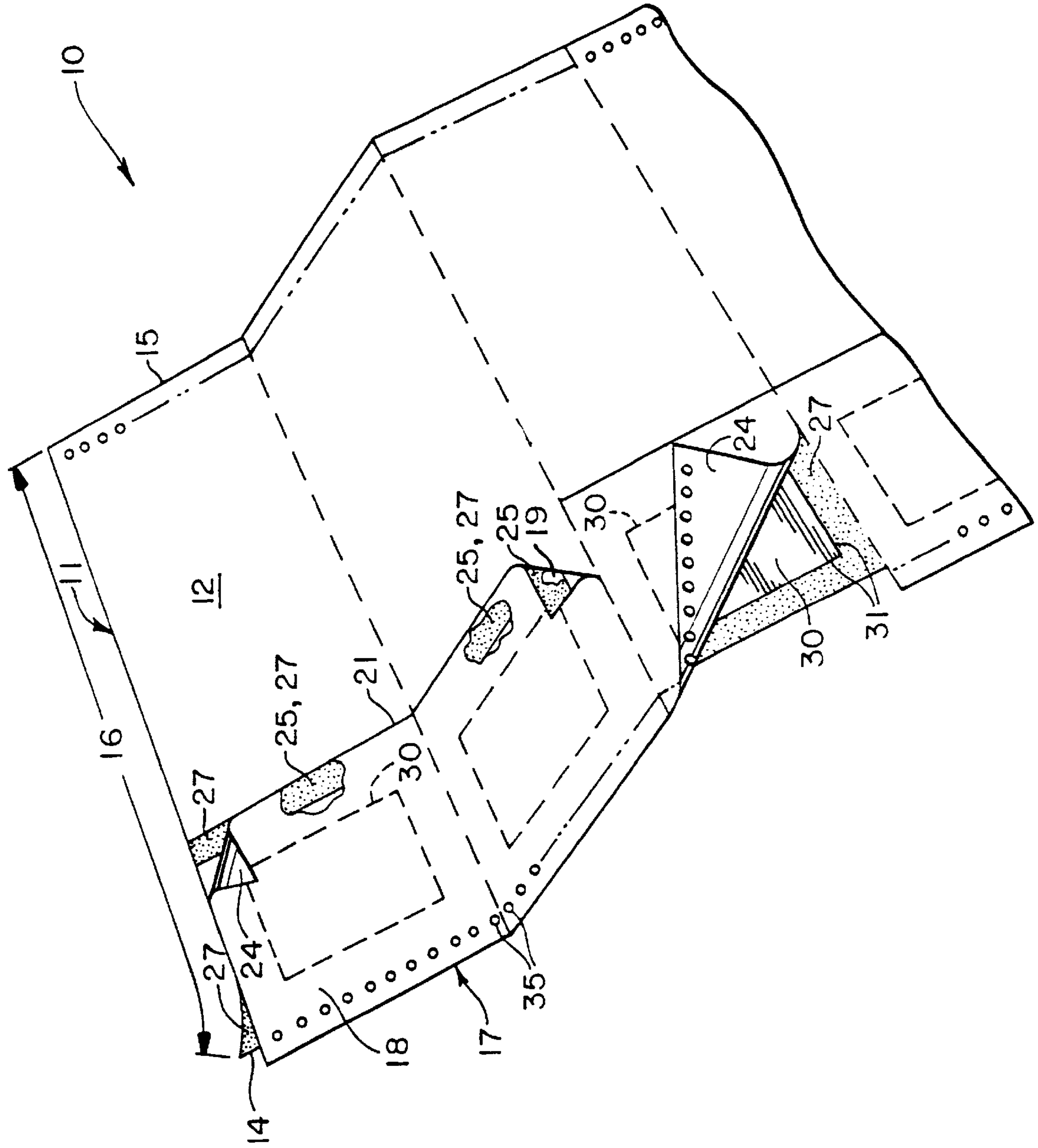
FIG. 1 is a bottom perspective view of an exemplary embodiment of a business form with self-contained labels according to the present invention.
Figure 2:
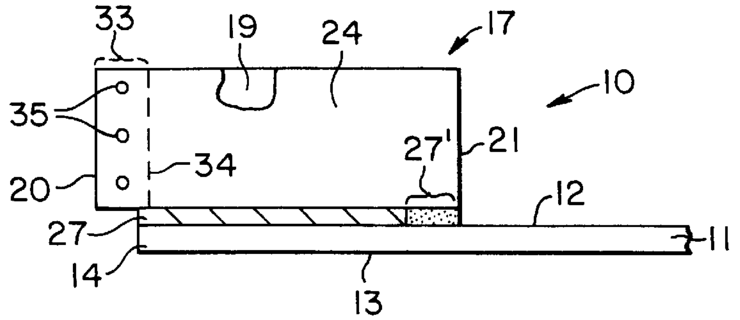
FIG. 2 is a schematic end detail view of the overlapped areas between the plies of the form of FIG. 1, showing the release liner pulled up away from the cellulose ply to the extent allowed by the adhesive.
Figure 3:
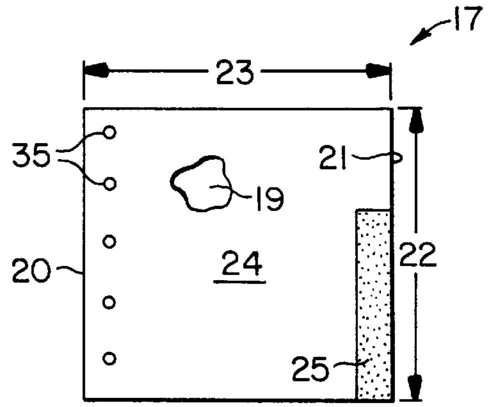
FIG. 3 is top plan view of a second face of the release liner ply of the business form of FIG. 1.

FIG. 1 is a bottom perspective view of one preferred embodiment of a business form according to the invention, while FIG. 2 is an end view of the overlapped area between the plies of the form of FIG. 1 showing the release liner pulled up away from the cellulose ply to the extent allowed by the adhesive which substantially permanently holds the release liner ply to the cellulose ply along the inner edge of the release liner ply, and FIG. 3 is a plan view of the second face of the release liner ply of the FIG. 1 embodiment. FIG. 1 shows a continuous form web, in which a plurality of individual forms are connected together by lines of weakness (such as perforation lines), as is well known in the art per se.

FIGS. 1–3 show a business form 10, which includes labels integral therewith. The form 10 comprises a first substantially rectangular cellulose ply 11 having first and second faces 12, 13, and first and second substantially parallel side edges 14, 15 having a first length, and spaced a first distance 16 from each other; and a second substantially rectangular ply 17 having first and second faces 18, 19, and first and second substantially parallel side edges 20, 21 having a second length 22, and spaced a second distance 23 which may be the same as the first distance or—in one embodiment—is at least 20% less than said first distance 16 (e. g. between 25–40% thereof).

The second face 19 of the second ply 17 has conventional adhesive release material (e. g. silicone) 24 over substantially the entire area thereof, except that no active release material is provided along a strip 25—best seen in FIG. 3—adjacent at least one of the first and second edges 20, 21, as seen in FIGS. 1–3 the strip 25 provided only at the second edge 21. The strip 25 preferably has a length of about 50–90% (preferably about 75%) of the second length 22. The second length 22 is typically (except in the FIG. 8 embodiment) substantially the same as the first length.

As seen in FIGS. 1 and 2, the second face 19 of the second ply 17 overlies the first face 12 of said first ply 11 with the first and second side edges 14, 15, 20, 21 of each substantially parallel to each other. Conventional pressure sensitive adhesive 27 (preferably a permanent type of pressure sensitive adhesive) is between said first ply 11 first face 12 and said second ply 17 second face 19 to readily releasably hold said plies 11, 17 together where said adhesive 27 engages said release material 24, and to substantially permanently hold said plies together where said second ply overlaps said first ply and there is no active adhesive release material on said second ply second face (i. e. at the strip 25). In order to clearly illustrate this, in FIG. 2 the area where the adhesive 27' engages the non-release material strip 25 is shown by reference numeral 27', but it is to be understood that it is really part of the general coat of adhesive 27, and typically not a separate or distinct adhesive or adhesive section.

The adhesive area 27' "substantially permanently" holds the piles 11, 17 together thereat because no release material is provided, therefore a normal act of separating a release liner from a label will meet with sufficient resistance at the area 27' that the user will understand that further separation thereat is not intended during normal use, while all of the areas of the face 19 have release material 24 thereon will be easily separated from the ply 11. However the plies 11, 17 can of course be separated at the area 27' by providing a much stronger pulling force, which force will actually cause the cellulose of the ply 11 to separate along a plane parallel to the faces 12, 13, the fibers of the ply 11 actually separating from each other. In this situation, the adhesive 27 typically stays with the ply 17 at the area 27'. This type of destructive separation is sometimes desirable (e. g. for ease of recycling), and the construction of the invention facilitates it, since a start to this destructive separation is allowed by the user pulling on ply 17 at the edge 21 where there is release material 24 and adhesive separation is easy.

The business form 10 first ply 11 also has at least one label 30 formed therein by conventional die cuts (a die cut 31 is seen in FIG. 1) or conventional lines of weakness where said first ply 11 overlies said second ply 17. The labels 30 are primarily seen in dotted line in FIG. 1 because they are not visible in or through the ply 17 and the die cut lines 31 do not typically extend through the ply 17.

In the FIGS. 1–3 embodiment, the first edge 20 of the second ply 17 preferably extends past the first edge 14 of the first ply 11, as see most clearly in FIG. 2 but also visible in FIG. 1. This non-overlapping section is shown by reference numeral 33 in FIG. 2. Typically no perforation lines or other lines of weakness are provided therein, but if desired they may be (as seen schematically at 34 in FIG. 2). Typically the face 19 at the section 33 is covered by release material 24, but it need not be since it will not engage the adhesive 27. Also, conventional tractor drive holes 35 are provided in section 33 to facilitate handling of the entire continuous form of FIG. 1, and the section 35 may be slit off from the rest of the form 10 after processing, using conventional equipment. Tractor drive holes 36 are typically also provided at edge 15 of ply 11, and they too may be slit off after processing of the continuous form of FIG. 1 (that is after complete formation and imaging (e. g. printing) thereof).

While the form 10 is not shown with indicia, it is to be understood that typically indicia will be applied thereto, at least to the face 13, and especially at the area of the label or labels 30 on the first face 13. Any suitable variable or non-variable indicia, using any conventional imaging techniques, may be applied.

The form 10 is typically formed on a Flexo or Litho presss or the like. In a typical manner of construction, the following steps are practiced:

(a) providing a first cellulose material ply 11 in web form, the first ply having first and second faces 12,13, and first and second substantially parallel side edges 14, 15.

(b) providing a second ply 17 in web form, the second ply having first and second faces 18, 19 and first and second substantially parallel side edges 20, 21.

(c) skip coating adhesive release material (e. g. silicone) 24, using conventional techniques onn a Flexo or Litho press or presiliconed press, on the second ply second face so that it substantially covers the second ply second face except along at least one edge strip 25 adjacent at least one of the first and second side edges (e. g. edge 21 in FIGS. 1–3), to provide an edge strip 27 with no adhesive release material, which strip 27 has a length which is less than the entire length of a said side edge.

(d) applying pressure sensitive adhesive 27 (using a conventional coater section of the press) to at least the majority of the second face of the second ply, including at the edge strip 25.

(e) bringing the second face of the second ply into juxtaposition with the first face of the first ply (using conventional mating rollers and drives, for example) so that the plies at least partially overlap and the edge strip of the second ply is between the first and second edges of the first ply, and so that the adhesive readily releasably holds the first and second plies together except at the edge strip, where the adhesive substantially permanently holds the first and second plies together (as seen in FIGS. 1 and 2).

And (f) forming at least one label 30 in the first ply where the first ply overlaps the second ply and is adhesively held thereto, for example using conventional die cutters on the press, which form the die cut lines 31, or alternatively using conventional perforating equipment.

Figure 4:
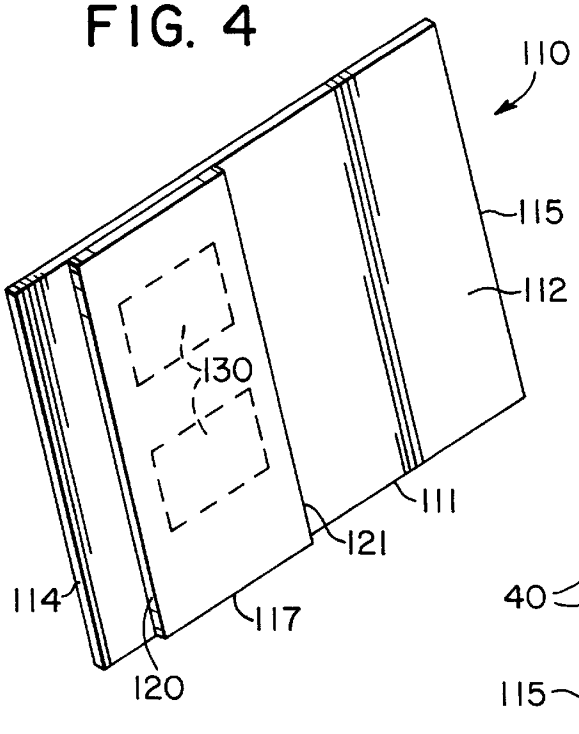
FIG. 4 is a schematic perspective view of a second embodiment of a business form according to the present invention.
Figure 5:
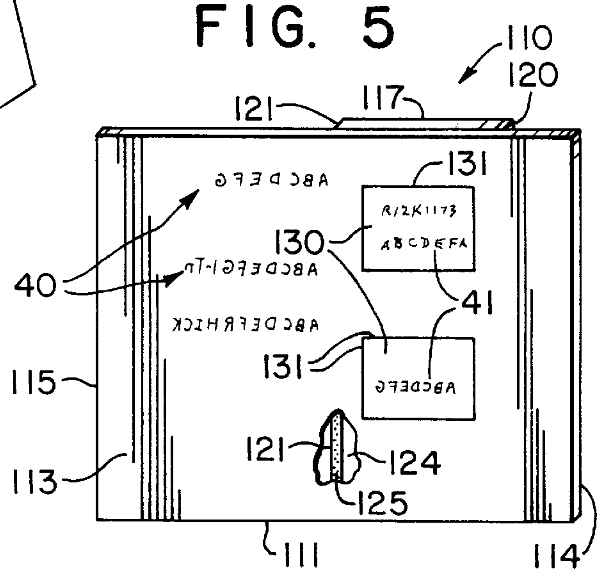
FIG. 5 is a slightly forwardly tilted plan view of the top face of the form of FIG. 4.

A wide variety of other embodiments may also be provided, some of which are seen in FIGS. 4–8. FIGS. 4 and 5 schematically show an embodiment similar to that of FIGS. 1–3 except that the first edge of the second (release liner) ply does not extend past the first edge of the cellulose ply. FIG. 4 is a view like that of FIG. 1, and FIG. 5 is a slightly forwardly tilted Oust to show the position of the second ply) plan view of the FIG. 4 form showing the face of the form. In the FIGS. 4 and 5 embodiment components and features comparable to those of the FIGS. 1–3 embodiment are shown by the same reference numeral only preceded by a “1”. The strip 125 is only seen where the ply 111 is cut away in FIG. 5. Note that the edge 120 is “inside” (that is not extending outwardly from) the edge 114. FIG. 5 schematically shows typical indicia 40 that may be applied to that part of the face 113 not overlapping the ply 117, while indicia 41 is shown on the labels 130 (which are obviously at a portion of the face 113 that does overlap ply 117).

Figure 6:
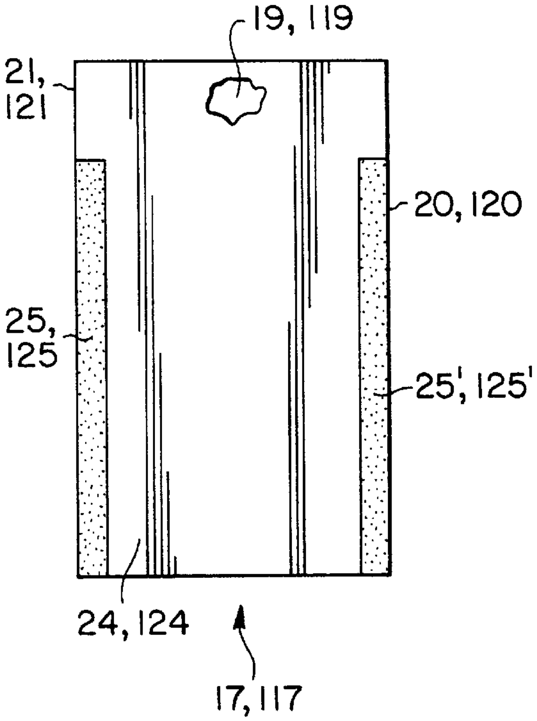
FIGS. 6 and 7 are plan views of different configurations that the second plies of the FIGS. 1 through 3, and 4 and 5, embodiments may have.
Figure 7:
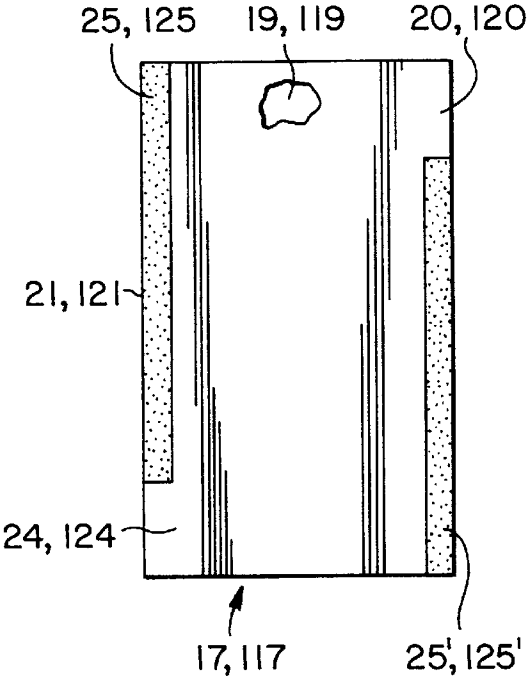

FIGS. 6 and 7 are plan views of various configurations that the ply 17, 117 could have. Instead of just one strip 25, 125 of no active release material 24, 124, two strips are provided, the strip 25', 125' adjacent the edge 20, 120. The strips 25, 25', etc. may have either of the configurations illustrated, and typically—as also in the FIGS. 1–3 embodiment—the adhesive release material 24, 124 is provided at one end of each of the edges 20, 21, 120, 121, in order to facilitate destructive tearing separation, when desired.

Figure 8:
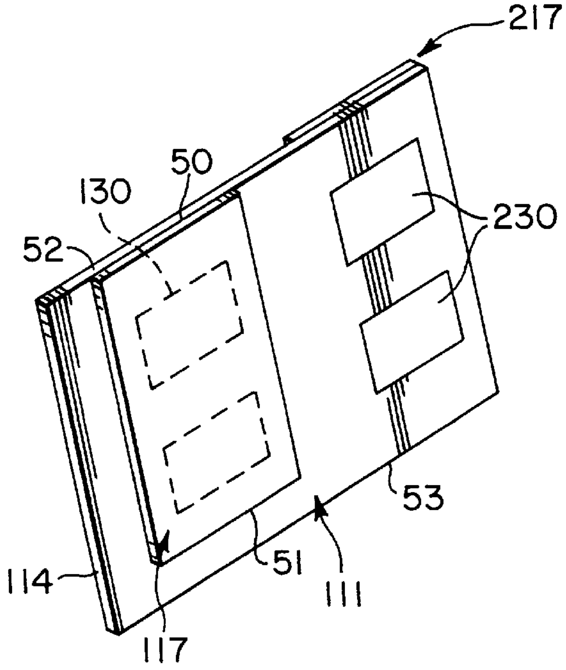
FIG. 8 is a view, like that of FIG. 4, of another embodiment of a business form which has a third ply.

FIG. 8 is similar to FIG. 4 except that a third ply 217 substantially identical to the ply 117 is provided on the face 112 so that another set of labels 230 is provided. Also in this embodiment, the ply 117 is shown in a slightly modified form in that the end edges 50, 51 thereof are within the end edges 52, 53 of the ply 111, so that the ply 117 is completely surrounded by the ply 111.

While in the preferred embodiment, the strip or strips 25, 25', 125, 125' are formed by strip coating adhesive release material 24, 124, it is possible to fully coat the adhesive release material 24, 124 on the face 19, 119 and then at least partially deactivate it, either mechanically (e. g. by roughening it), chemically, or with suitable radiation (or by not applying curing radiation, e. g. UV radiation, thereto), depending upon the exact release material 24, 124 utilized.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A business form comprising:

a first substantially rectangular cellulose ply having first and second faces, and first and second substantially parallel side edges having a first length, and spaced a first distance from each other;

a second substantially rectangular ply having first and second faces, and first and second substantially parallel side edges having a second length, and spaced a second distance;

said second face of said second ply having adhesive release material over substantially the entire area thereof, except that no active release material is provided along a strip adjacent at least one of said first and second edges said strip having a length of about 50–90% of said second length;

said second face of said second ply overlying said first face of said first ply with said first and second side edges of each substantially parallel to each other;

pressure sensitive adhesive between said first ply first face and said second ply second face to readily releasably hold said plies together where said adhesive engages said release material, and to substantially permanently hold said plies together where said second ply overlaps said first ply and there is no active adhesive release material on said second ply second face; and wherein said first ply has at least one label formed therein by die cuts or lines of weakness where said first ply overlies said second ply, and wherein an end portion of said second ply at said second edge includes active adhesive release material.

2. A business form as recited in claim 1 wherein said strip with no active release material is formed by strip coating said second ply so that no release material at all is provided at said strip.

3. A business form as recited in claim 1 further comprising a third ply like said second ply only disposed in association with said first ply second face, with adhesive between said third ply second face and first ply second face.

4. A business form as recited in claim 1 wherein said second ply is completely within the area encompassed by said first ply.

5. A business form as recited in claim 1 wherein said second distance is at least 20% less than said first distance.

6. A business form as recited in claim 1 wherein a strip having no active release material is provided only along said second edge of said second ply.

7. A business form as recited in claim 6 wherein said first edge of said second ply extends past said first edge of said first ply so that said plies do not overlap at an exposed strip at said first edge of said second ply.

8. A business form as recited in claim 7 wherein said exposed strip has tractor drive holes formed therein, and wherein said second distance is between about 25–40% of said first distance.

9. A business form as recited in claim 1 wherein said second ply first and second edges are between said first ply first and second edges.

10. A business form as recited in claim 1 wherein said second ply has strips having no active release material along both said first and second edges of said second ply.

11. A business form as recited in claim 1 further comprising a third ply like said second ply only disposed in association with said first ply second face, with adhesive between said third ply second face and first ply second face.

12. A business form comprising:

a first substantially rectangular cellulose ply having first and second faces, and first and second substantially parallel side edges having a first length, and spaced a first distance from each other;

a second substantially rectangular ply having first and second faces, and first and second substantially parallel side edges having a second length, and spaced a second distance;

said second face of said second ply having adhesive release material over substantially the entire area thereof, except that no active release material is provided along a strip adjacent at least one of said first and second edges said strip having a length of about 50–90% of said second length;

said second face of said second ply overlying said first face of said first ply with said first and second side edges of each substantially parallel to each other;

pressure sensitive adhesive between said first ply first face and said second ply second face to readily releasably hold said plies together where said adhesive engages said release material, and to substantially permanently hold said plies together where said second ply overlaps said first ply and there is no active adhesive release material on said second ply second face; and wherein said first edge of said second ply extends past said first edge of said first ply so that said plies do not overlap at an exposed strip at said first edge of said second ply.

13. A business form as recited in claim 12 wherein said first ply has at least one label formed therein by die cuts or lines of weakness where said first ply overlies said second ply, and wherein an end portion of said second ply at said second edge includes active adhesive release material.

14. A business form as recited in claim 13 wherein a strip having no active release material is provided only along said second edge of said second ply.

15. A business form as recited in claim 14 wherein said first edge of said second ply extends past said first edge of said first ply so that said plies do not overlap at an exposed strip at said first edge of said second ply.

16. A business form as recited in claim 15 wherein said exposed strip has tractor drive holes formed therein, and wherein said second distance is between about 25–40% of said first distance.

17. A business form as recited in claim 13 wherein said second ply first and second edges are between said first ply first and second edges.

18. A business form as recited in claim 13 wherein said second ply has strips having no active release material along both said first and second edges of said second ply.

19. A business form as recited in claim 13 further comprising a third ply like said second ply only disposed in association with said first ply second face, with adhesive between said third ply second face and first ply second face.

20. A business form as recited in claim 12 wherein said exposed strip has tractor drive holes formed therein.

* * * * *